(12) United States Patent
Wolfgang et al.

(10) Patent No.: US 8,095,286 B2
(45) Date of Patent: Jan. 10, 2012

(54) METHOD FOR CONTROLLING SHIFTS IN AN AUTOMATED GEARSHIFT TRANSMISSION

(75) Inventors: Werner Wolfgang, Ravensburg (DE); Maik Wurthner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 448 days.

(21) Appl. No.: 12/405,715

(22) Filed: Mar. 17, 2009

(65) Prior Publication Data

US 2009/0240408 A1     Sep. 24, 2009

(30) Foreign Application Priority Data

Mar. 19, 2008  (DE) .................. 10 2008 000 747

(51) Int. Cl.
*G06F 19/00*     (2011.01)
(52) U.S. Cl. ............... 701/55; 701/53; 701/93; 701/95
(58) Field of Classification Search .................. 701/51, 701/55, 93, 95
See application file for complete search history.

(56) References Cited

U.S. PATENT DOCUMENTS

| | | | |
|---|---|---|---|
| 5,230,400 A | 7/1993 | Kakinami et al. | |
| 6,076,622 A | 6/2000 | Chakraborty et al. | |
| 6,662,098 B2 | 12/2003 | Hellmann et al. | |
| 2006/0293825 A1 | 12/2006 | Sporl et al. | |
| 2007/0198161 A1* | 8/2007 | Pfeiffer et al. | 701/93 |
| 2008/0183371 A1* | 7/2008 | Wolfgang et al. | 701/103 |
| 2009/0160379 A1* | 6/2009 | Doerr et al. | 318/400.15 |

FOREIGN PATENT DOCUMENTS

| | | |
|---|---|---|
| DE | 101 15 052 A1 | 10/2001 |
| DE | 102 27 719 | 6/2002 |
| DE | 10 2004 025 741 | 5/2004 |
| DE | 10 2004 025741 A1 | 12/2005 |
| EP | 1 248 021 A1 | 10/2002 |

* cited by examiner

*Primary Examiner* — Hussein A. Elchanti
(74) *Attorney, Agent, or Firm* — Davis & Bujold, P.L.L.C.

(57) ABSTRACT

A method for controlling a vehicle's automated transmission, which is arranged in a drive train in the force flow between a engine and a drive axle or a transfer box, depending on certain operating parameters and control actions of an adaptive cruise control system (ACC) that can be operated using engine and brake mechanisms to regulate speed and distance from a car in front. The method controls the transmission when an engine torque demand differs from the torque demand of the ACC. The operating mode of the ACC, which is active at the time, and the load direction of the torque demand of the ACC are determined, and the torque demand, used for controlling the transmission when speed or distance regulation is activated, is determined depending on the ACC operating mode and the load direction of the torque demand.

8 Claims, 3 Drawing Sheets

| Distance | Driving situation | Traction operation | |
|---|---|---|---|
| | | Upshift | Downshift |
| OK | following | both vehicles accelerate on level ground | both vehicles decelerate on level ground |
| | approaching | one's own vehicle accelerates on level ground and is faster than the vehicle ahead | one's own vehicle decelerates uphill and is faster than the vehicle ahead |
| | falling back | one's own vehicle accelerates on level ground and is slower than the vehicle ahead | one's own vehicle decelerates uphill and is slower than the vehicle ahead |
| Too small | following | (not relevant, since if the distance is too small no traction operation is possible) | |
| | approaching | | |
| | falling back | | |
| Too large | following | both vehicles accelerate on level ground | both vehicles decelerate on level ground |
| | approaching | one's own vehicle accelerates on level ground and is faster than the vehicle ahead | one's own vehicle decelerates uphill and is faster than the vehicle ahead |
| | falling back | one's own vehicle accelerates on level ground and is slower than the vehicle ahead | one's own vehicle decelerates uphill and is slower than the vehicle ahead |

| Distance | Driving situation | Traction operation | |
|---|---|---|---|
| | | Upshift | Downshift |
| OK | following | both vehicles accelerate on level ground | both vehicles decelerate on level ground |
| OK | approaching | one's own vehicle accelerates on level ground and is faster than the vehicle ahead | one's own vehicle decelerates uphill and is faster than the vehicle ahead |
| OK | falling back | one's own vehicle accelerates on level ground and is slower than the vehicle ahead | one's own vehicle decelerates uphill and is slower than the vehicle ahead |
| Too small | following | (not relevant, since if the distance is too small no traction operation is possible) | |
| Too small | approaching | | |
| Too small | falling back | | |
| Too large | following | both vehicles accelerate on level ground | both vehicles decelerate on level ground |
| Too large | approaching | one's own vehicle accelerates on level ground and is faster than the vehicle ahead | one's own vehicle decelerates uphill and is faster than the vehicle ahead |
| Too large | falling back | one's own vehicle accelerates on level ground and is slower than the vehicle ahead | one's own vehicle decelerates uphill and is slower than the vehicle ahead |

Fig. 2

| Distance | Driving situation | Thrust operation | |
|---|---|---|---|
| | | Upshift | Downshift |
| OK | following | on transition from downhill to level ground (engine drag torque is reduced) | both vehicles decelerate downhill (permanent braking power fully used) |
| | approaching | (not relevant) | one's own vehicle accelerates downhill and is faster than the vehicle ahead |
| | falling back | one's own vehicle decelerates on level ground and is slightly slower than the vehicle ahead | (not relevant) |
| Too small | following | (not relevant, since if the distance is too small no upshift is possible) | both vehicles decelerate downhill (permanent braking power fully used) |
| | approaching | | one's own vehicle accelerates downhill and is faster than the vehicle ahead |
| | falling back | | (not relevant) |
| Too large | following | (not relevant, since if the distance is too large no thrust operation is possible in the distance regulation mode) | |
| | approaching | | |
| | falling back | | |

Fig. 3

METHOD FOR CONTROLLING SHIFTS IN AN AUTOMATED GEARSHIFT TRANSMISSION

The Applicant claims priority from German Application No. 10 2008 000 747.1 filed Mar. 19, 2008.

FIELD OF THE INVENTION

The invention concerns a method for controlling shifts in an automated gearshift transmission which is arranged in a drivetrain of a motor vehicle, for example a commercial vehicle, in the force flow between a drive engine and a driving axle or a transfer box, and whose shift operations are controlled as a function of operating parameters and control actions of an Adaptive Cruise Control system (ACC system) that can be operated in a speed regulation mode and a distance regulation mode in the drive engine and in brake mechanisms of the motor vehicle, such that to control the gearshift transmission, when at least one specific operating condition exists, a torque demand ($M_{M\_mod}$) differing from the torque demand ($M_{M\_Soll}$) of the ACC system on the drive engine is used.

BACKGROUND OF THE INVENTION

In a motor vehicle equipped with an automated gearshift transmission, such as an automated shift transmission, an automated dual-clutch transmission or a converter automatic transmission, during normal operation, i.e. during driving operation governed solely by control actions of the driver, in particular deflection of the accelerator pedal, shift operations are controlled as a function of operating parameters detected by sensors or calculated from sensor data, such as the actual travel speed, the actual driving resistance, the actual engine torque ($M_{M\_Ist}$) and the actual running speed of the drive engine and the power demanded by the driver as manifested by the actual current deflection of the accelerator pedal, with reference to shift characteristics stored in a data memory of the associated transmission control unit.

To make things easier for the driver, however, for a long time driver-assistance systems called Tempomat or CC systems (CC=Cruise Control) have been known, which enable driving speeds to be set by the driver, which are maintained automatically using an operating unit. In recent years such driver-assistance systems have been extended further by a distance regulation function and thereby developed further into Tempomat distance-regulating or ACC systems (ACC=Adaptive Cruise Control).

When the ACC system is switched on, a speed regulation mode is activated at first, so long as an area of the road ahead of one's own motor vehicle is free from other vehicles. In this speed regulation mode the drive engine and existing permanent braking devices, such as an engine brake and a permanent brake made for example as a retarder, are controlled in such manner that a desired speed, specified by the driver, is largely maintained. By means of a sensor device, preferably comprising at least one radar sensor, the area ahead of one's own motor vehicle is constantly scanned, vehicles driving ahead are recognized, and their driving direction, distance away, and relative speed are determined.

If a vehicle driving ahead in the same lane more slowly is getting too close, a distance regulation mode of the ACC system is activated, in which a required deceleration is calculated, which is necessary in order to follow the vehicle ahead at a distance that can previously be input to the operating unit by the driver. To produce this required deceleration the drive engine, the permanent brake devices and if necessary also the service brakes of the motor vehicle are appropriately controlled so that the specified distance from the vehicle driving ahead will largely be maintained. Thereafter, by virtue of appropriately controlling the drive engine, the permanent brakes and the service brakes, one's own motor vehicle follows the vehicle driving ahead of it at the specified distance. When the vehicle ahead is no longer there, i.e. it has turned off the road or accelerated to a speed higher than the specified speed, the ACC system reverts to the speed regulation mode (Tempomat operation). Other than by manually switching off the ACC system, it can also be deactivated at least temporarily by control actions by the driver, such as overriding the current power setting of the drive engine by actuating the accelerator pedal, a definite actuation of the brake pedal, and a steering movement that results in leaving the lane.

In the speed regulation mode and in the distance regulation mode, the control of a gearshift transmission, i.e. the determination of the target gear or gear change interval in each case and the associated shift or target engine speed for initiating upshifts and downshifts, takes place only indirectly as a function of the speed or distance regulation of the ACC system, namely as a function of the actual torque demand ($M_{M\_Soll}$) on the drive engine and other operating parameters influenced by control or regulating actions of the ACC system.

In this, it has already been shown in CC systems comprising only a speed regulation mode that in certain operating situations the use of the respective torque demand ($M_{M\_Soll}$) on the drive engine for controlling the gearshift transmission is inappropriate, because thereby, if there is a large speed difference ($\Delta v = v_{Soll} - v_{Ist}$) between the nominal speed ($v_{Soll}$) and the current actual speed ($v_{Ist}$) unnecessary fluctuating shifts, i.e. repeated upshifts and downshifts can be triggered. Disadvantageously, these unnecessary shifts result in higher fuel consumption, greater wear of the shift elements, and deterioration of the driving comfort of the motor vehicle concerned.

To avoid unnecessary traction downshifts a method is proposed, for example in DE 101 15 052 A1, according to which, in traction operation, the torque demand ($M_{M\_Soll} > 0$) of an ACC system for controlling the drive engine when a speed or distance regulation mode is activated for the control of the associated gearshift transmission in general, is restricted for example to a value of 80% ($M_{M\_mod} = 0.8 * M_{M\_Soll}$), and this restriction is lifted only under certain operating conditions. The restriction is lifted when the difference ($\Delta M = M_{M\_Soll} - M_{M\_Ist}$) between the torque demand ($M_{M\_Soll}$) and the actual torque ($M_{M\_Ist}$) of the drive engine at the time exceeds a first limit value, and/or when the actual torque ($M_{M\_Ist}$) exceeds a second limit value close to the maximum torque ($M_{M\_Max}$) of the drive engine. With this known method a possibly necessary rapid acceleration of the motor vehicle should still be possible.

When the distance regulation mode is active another problem can arise if, to avoid a dangerous approach to a vehicle driving ahead more slowly, the service brake is actuated and when this braking action makes the transmission control inaccessible. In such a case the driving resistance is mistakenly determined as too large by the amount of the braking torque of the service brake, which can result is unnecessary thrust downshifts at shift speeds that are too high.

SUMMARY OF THE INVENTION

Accordingly, the purpose of the present invention is to provide a method of the type described at the start for controlling an automated gearshift transmission, with which the shifting behaviour of the gearshift transmission when a speed or distance regulating mode of an Adaptive Cruise Control system (ACC system), is activated can be improved so as to reduce fuel consumption, and wear and increase driving comfort.

The starting point of the invention is therefore a method for controlling shifts in an automated gearshift transmission arranged in a drivetrain of a motor vehicle, for example a commercial vehicle, in the force flow between a drive engine and a drive axle or a transfer box, and whose shift operations are controlled as a function of operating parameters and of control actions of an Adaptive Cruise Control and control system (ACC system) that can be operated in a speed regulation mode and in a distance regulation mode in the drive engine and in brake mechanisms of the motor vehicle, such that to control the gearshift transmission, when at least one specific operating condition exists, a torque demand ($M_{M\_mod}$) differing from the torque demand ($M_{M\_Soll}$) of the ACC system on the drive engine is used. Furthermore, the method provides that the operating mode of the Adaptive Cruise Control system (ACC system) activated at the time and the load direction of the torque demand by the ACC system on the drive engine ($M_{M\_Soll}>0$; $M_{M\_Soll}<0$) are determined, and the torque demand ($M_{M\_mod}$) used for controlling the gearshift transmission, when the speed or distance regulation mode is activated, is determined as a function of the operating mode (speed or distance regulation mode) and the load direction (traction operation or thrust operation) of the torque demand.

The drive engine can consist for example of an internal combustion engine or an electric motor. In this context 'drive engine' can be understood to mean either a single drive engine or an arrangement of more than one drive engine which, as a hybrid drive system, is connected directly or indirectly with the input shaft of the automated gearshift transmission. The hybrid drive system can for example comprise an internal combustion engine and an electric motor, which can be operated as the driving unit either individually or in combination. Between the combustion engine and the electric motor there can be arranged a clutch, which is disengaged when the drivetrain is powered exclusively by the electric motor.

If the automated gearshift transmission is indirectly connected to the drive engine, then at least one clutch, for example a controllable friction clutch, can be arranged between the gearshift transmission and the drive engine.

In the context of the present invention the term "automated gearshift transmission" should be understood to mean any transmission with automated or automatic gear changes, such as automated shift transmissions, change-under-load transmissions, dual clutch transmissions and automatic gearshift transmissions.

In principle there can be four different methods for determining the torque demand ($M_{M\_mod}$) used for controlling the gearshift transmission, whereby the shifting behaviour of the gearshift transmission can be adapted optimally to reduce fuel consumption, and wear and increase driving comfort of the motor vehicle concerned.

Thus, the torque demand $M_{M\_mod}$ used to control the gearshift transmission when the speed regulation mode is activated in traction operation, ($M_{M\_Soll}>0$) is expediently determined by means of a function $F_1(\Delta v)$ as a function of the speed difference ($\Delta v = v_{Soll} - v_{Ist}$) between the desired speed $v_{Soll}$ set in the ACC system and the actual speed $v_{Ist}$ of the motor vehicle, this function $F_1(\Delta v)$ increasing proportionally with the speed difference $\Delta v$. In this way unnecessary traction downshifts, when the speed difference ($\Delta v = v_{Soll} - v_{Ist}$) is small are avoided, but rapid attainment of the desired speed $v_{Soll}$ when there is a large speed difference $\Delta v$, which occurs mainly when the Tempomat distance regulation is switched on with a setting of a high desired speed $v_{Soll}$, is still possible.

In contrast, when the distance regulation mode is activated the torque demand $M_{M\_mod}$ in traction operation ($M_{M\_Soll}>0$) used to control the gearshift transmission and is preferably determined from the torque demand $M_{M\_Soll}$ on the drive engine and decreased by means of a time-limited filter function $F_{Filter}(t)$ such that ($M_{M\_mod} = F_{Filter}(t) * M_{M\_Soll}$). In this way, on the one hand a rapid shift reaction to maintain the specified distance from the vehicle driving ahead is enabled, but at the same time alternating shifts caused by overriding of the distance regulation are avoided.

When the motor vehicle is in thrust operation ($M_{M\_Soll}<0$), the torque demand $M_{M\_mod}$ used to control the gearshift transmission in the speed regulation and in the distance regulation modes can be determined in the same way, in that a fictitious desired thrust ($M_{M\_mod}<0$) is determined as a function of the torque demand ($M_{M\_Soll}<0$) on the drive engine and the actuated brake mechanisms ($M_{Br\_Mot}<0$, $M_{Br\_Ret}<0$, $M_{Br\_Rad}<0$), such that ($M_{M\_mod} = F_2(M_{M\_Soll}, M_{Br\_Mot}, M_{Br\_Ret}, M_{Br\_Rad})$). In that case the specific shifting behavior of the gearshift transmission in thrust operation is in each case determined by adapting the corresponding shift and target engine speeds to specific requirements of the vehicle manufacturer.

Thrust upshifts are usually carried out only as engine protection shifts, in order to avoid engine damage caused by over-revving. However, to reduce fuel consumption it is also advantageous, when the speed or distance regulation mode is activated in thrust operation ($M_{M\_Soll}<0$), to determine in addition the climbing resistance due to road inclination and from this calculate the climbing resistance gradient, and if a downward variation is found, then to carry out a thrust upshift already before the transition to traction operation.

A further fuel consumption reduction and driving comfort improvement can be achieved, when the distance regulation mode is activated during traction or thrust operation ($M_{M\_Soll}>0$, $M_{M\_Soll}<0$), by determining in addition the distance from the vehicle driving in front and from it calculating the time gradient of the distance, and if a distance increase is detected (for example because one's own vehicle has fallen back), carrying out a traction or thrust upshift.

Since to determine the respective optimum gear as an essential control parameter the actual driving resistance at the time is constantly determined, automatic actuation of the service brakes, i.e. the wheel brakes, by the ACC system, which can take place during thrust operation when the distance regulation mode is active, generally constitutes a problem because the transmission control system, unaware of the brake actuation, mistakenly overestimates the driving resistance by the amount of the braking torque of the service brakes, which can result in corresponding erroneous reaction behavior of the gearshift transmission. In contrast, the braking torques $M_{Br\_Mot}$, $M_{Br\_Ret}$ produced respectively by automatic actuation of an engine brake, which can be in the form of a controllable exhaust gas valve and/or a special control of the outlet valves of the drive engine, and by automatic actuation of a permanent brake for example in the form of a retarder, are each known from the control units involved or their control signals, and are taken into account when determining the driving resistance.

To avoid erroneous determination of the actual driving resistance it is therefore expedient, when the distance regulation mode is active during thrust operation ($M_{M\_Soll}<0$), for automatic actuation of the service brakes by the ACC system to be detected by sensors at least qualitatively, so that when such a brake actuation is detected, the driving resistance determination is halted, i.e. not carried out, for as long as the brake actuation lasts.

However, a related improvement can be achieved if, when the distance regulation mode is active during thrust operation ($M_{M\_Soll}<0$), an automatic service brake actuation by the ACC system is detected respectively by a brake pressure sensor on each of the braked wheels and solo or trailer operation of the vehicle, and when solo operation is recognized the braking torque of the service brakes $M_{Br\_Rad}$ is calculated from the brake pressures ($p_{Br\_Rad}>0$) and the actual driving resistance therefore computed, whereas in contrast, if trailer operation is recognized, the driving resistance determination is suspended or halted for the duration of the brake actuation. Since modern commercial vehicles such as platform trucks and semitrailer tractors are often already fitted with brake pressure sensors whereas in contrast the corresponding trailers and semitrailers are not, the braking torque $M_{Br\_Rad}$ of the service brakes in solo operation can be calculated relatively accurately from the brake pressures $p_{Br\_Rad}$. Whether operation is in the solo or trailer mode this can in any case be determined with reference to the occupation or otherwise of the corresponding electric plug sockets on the vehicle.

In the method according to the invention for controlling shifts in the gearshift transmission, in order to avoid additional equipment expenditure it is appropriate to have recourse only to sensor and control data which are in any case available as standard in the data bus system of the drivetrain, i.e. in the case of a correspondingly equipped commercial vehicle usually available in a CAN bus system in the SAE J1939 protocol.

BRIEF DESCRIPTION OF THE DRAWINGS

To explain the invention further, the description of a drawing is attached, which shows:

FIG. 2: Table showing relevant driving situations of a motor vehicle with the distance regulation mode of the ACC system activated during traction operation; and FIG. 3: Table showing relevant driving situations of a motor vehicle with the distance regulation mode of the ACC system activated during thrust operation.

DETAILED DESCRIPTION OF THE DRAWINGS

Figure 1:
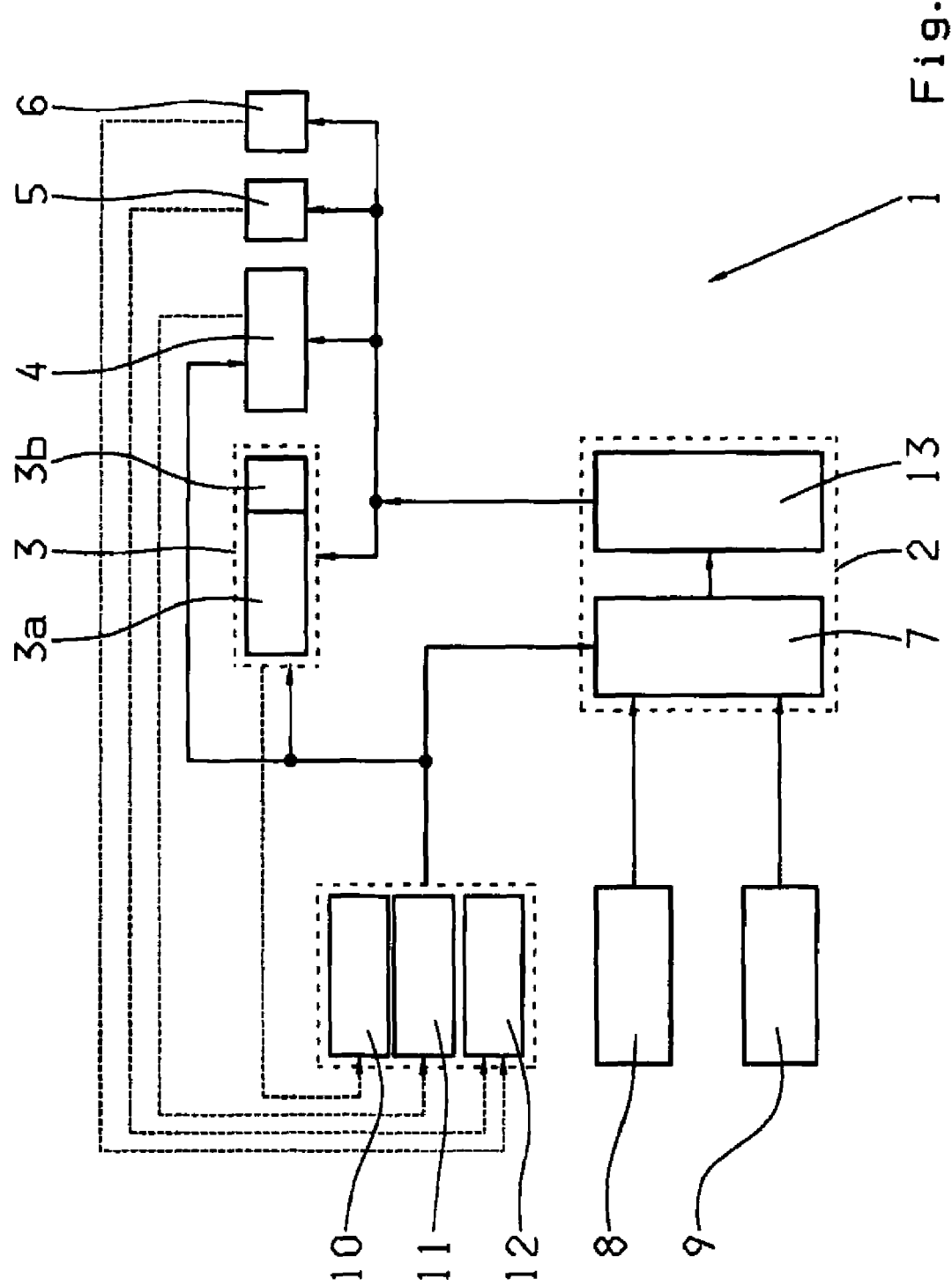
FIG. 1: Signal flow diagram to explain the control and action relationships in the drivetrain of a motor vehicle equipped with an automated gearshift transmission and an Adaptive Cruise Control system.

A control unit 1 of a motor vehicle equipped with a gearshift transmission and an Adaptive Cruise Control system (ACC system), shown in FIG. 1, comprises an ACC control unit 2, an engine control unit 3, a transmission control unit 4, a brake control unit 5 of a permanent brake, and a brake control unit 6 of the service brakes. To an evaluation unit 7 of the ACC control unit 2 are supplied settings data from an ACC operational unit 8 and sensor data from an ACC sensor unit 9. To the ACC operational unit the driver can input a desired speed $v_{Soll}$ to be maintained when the ACC system is in speed-regulating mode and a desired distance from a vehicle in front to be maintained when the ACC system is in distance-regulating mode.

The ACC sensor device 9 comprises at least one radar sensor by which, when the ACC system is switched on, the area ahead of the vehicle concerned is constantly scanned and, by corresponding evaluation of the sensor signals, vehicles driving ahead are recognized and their driving direction, distance away and relative speed are determined. For this purpose operating condition data are also supplied to the evaluation unit 7, coming from engine sensors 10, transmission sensors 11 and other sensors 12, or which are passed on directly from other control units 3, 4, 5, 6.

The result of the evaluation in the evaluation unit 7 is a desired acceleration or desired deceleration $a_{Soll}$, which is sent to a distance regulator 13 of the ACC control unit 2 as an input magnitude. In the distance regulator 13, from the desired acceleration or deceleration $a_{Soll}$ control commands for controlling the drive engine, the gearshift transmission and the brake mechanisms of the motor vehicle are derived, which are intended to produce the desired acceleration or deceleration $a_{Soll}$. The control commands of the distance regulator 13 are therefore sent to the engine control unit 3, which besides a normal engine control system 3a also comprises an engine brake control system 3b. Furthermore, the control commands of the distance regulator 13 are also passed on to the transmission control unit 4, the brake control unit 5 of the permanent brakes and the brake control unit 6 of the service brakes.

Whereas the drive engine, the engine brake, the permanent brakes and the service brakes are all controlled directly by the distance regulator 13 of the ACC control unit 2, in the transmission control unit 4, at least in some operating situations and in particular when the distance regulation mode of the ACC system is activated and the drive engine is operating is a thrust mode ($M_{M\_Soll}<0$), the torque demand $M_{M\_Soll}$ of the braking torque $M_{Br\_Mot}$ of the engine brake, the braking torque $M_{Br\_Ret}$ of the permanent brake and if necessary the braking torque $M_{Br\_Rad}$ of the service brakes, together with other operating parameters, are evaluated and from this a modified torque demand $M_{M\_mod}$ for controlling the shift operations of the gearshift transmission is determined.

By virtue of this shift control of the gearshift transmission using the modified torque demand $M_{M\_mod}$, unnecessary shifts and the associated disadvantages, such as higher fuel consumption, greater wear on the shift elements of the gearshift transmission and poorer driving comfort, are avoided. In addition, with this procedure it is possible to detect certain operating situations such as driving with the speed or distance regulation mode activated during thrust operation and downhill, and driving with the distance regulation mode active during traction or thrust operation when the distance away from a vehicle ahead is becoming larger, and in such cases to carry out a traction or thrust upshift respectively, in order to reduce fuel consumption further and to increase the driving comfort correspondingly.

The driving situations that are relevant when the distance regulation mode of the ACC system is activated, such as following a vehicle in front, getting closer to the vehicle in front, or falling back relative to the vehicle in front, the respective distance development, such as maintaining the desired distance (OK), too small a distance or too large a distance, and the consequently necessary or advantageous shift operations, are summarized in a self-explanatory manner for traction operation ($M_{M\_Soll}>0$) of the drive engine in the table of FIG. 2 and for thrust operation ($M_{M\_Soll}<0$) of the drive engine in the table of FIG. 3. In respect of their disclosure content they should be regarded as an integral part of the description.

Indexes

1 Control device
2 ACC control unit
3 Engine control unit
3a Normal engine control
3b Engine brake control
4 Transmission control unit
5 Control unit of the permanent brake
6 Control unit of the service brake
7 Evaluation unit
8 Operating unit
9 ACC sensor unit
10 Engine sensors
11 Transmission sensors
12 Other sensors
13 Distance regulator
$a_{Soll}$ Desired acceleration or deceleration
ACC Adaptive Cruise Control, Tempomat distance regulation
CC Cruise Control, Tempomat
$F_{Filter}$ Filter function
$F_1$ Function
F2 Function
$M_{Br}$ Braking torque
$M_{Br\_Mot}$ Braking torque of the engine
$M_{Br\_Rad}$ Braking torque of the service brakes
$M_{Br\_Ret}$ Braking torque of the permanent brakes
$M_M$ Torque of the drive engine, engine torque
$M_{M\_ist}$ Actual engine torque
$M_{M\_max}$ Maximum engine torque
$M_{M\_mod}$ Desired input torque of the transmission control
$M_{M\_Soll}$ Desired input torque of the engine control
$P_{Br}$ Brake pressure
$P_{Br\_Rad}$ Brake pressure of the wheel brakes
SAE Society of Automotive Engineers
t Time
v Driving speed
$v_{Ist}$ Actual driving speed
$v_{Soll}$ Desired driving speed
ΔM Torque difference
Δv Speed difference

The invention claimed is:

1. A method of controlling shifts in an automated gearshift transmission which is arranged in a drivetrain of a motor vehicle in a force flow between a drive engine and one of a drive axle or a transfer box, shift operations of the transmission being controlled as a function of operating parameters and control actions of an adaptive cruise control system (ACC system) that is operable in a speed regulation mode and a distance regulation mode, for controlling the drive engine and at least one brake mechanism of the motor vehicle, to control the gearshift transmission, and when at least one specific operating condition exists, a torque demand ($M_{M\_mod}$), for controlling the gearshift transmission, that differs from a torque demand ($M_{M\_Soll}$) of the adaptive cruise control system (ACC system) on the drive engine is used, the method comprising the steps of:
   determining an operating mode of the adaptive cruise control system (ACC system) that is active at the time and a load direction of the torque demand ($M_{M\_Soll}>0$; $M_{M\_Soll}<0$) of the adaptive cruise control system;
   determining the torque demand ($M_{M\_mod}$) for controlling the gearshift transmission when one of the speed regulation mode or the distance regulation mode is active as a function of the operating mode of the adaptive cruise control system (ACC system) that is active at the time and the load direction of the torque demand of the adaptive cruise control system (ACC); and
   determining the torque demand ($M_{M\_mod}$) used for controlling the gearshift transmission when the distance regulation mode is active during a traction operation ($M_{M\_Soll}>0$) from the torque demand ($M_{M\_Soll}$) on the drive engine which decreases by a time-limited filter function ($F_{Filter}(t)$) such that the torque demand ($M_{M\_mod}$) used for controlling the gearshift transmission equals the time-limited filter function ($F_{Filter}(t)$) multiplied by the torque demand ($M_{M\_Soll}$) on the drive engine ($M_{M\_mod}=F_{Filter}(t)*M_{M\_Soll}$).

2. The method according to claim 1, further comprising the step determining the torque demand ($M_{M\_mod}$), used for controlling the gearshift transmission when the speed regulation mode is activated during a traction operation ($M_{M\_Soll}>0$), by a function ($F_1(\Delta v)$) that considers a speed difference ($\Delta v=v_{Soll}-v_{Ist}$) between a desired speed ($v_{Soll}$) set in the adaptive cruise control system and an actual speed ($v_{Ist}$) of the motor vehicle at the time, with the function ($F_1(\Delta v)$) increasing proportionally to the speed difference ($\Delta v$).

3. The method according to claim 1, further comprising the step of utilizing only sensor and control data, which are available as standard in a data bus system (SAE J1939) of the drivetrain, for controlling the gearshift transmission.

4. The method according to claim 1, further comprising the step of determining a distance from a leading vehicle when the distance regulation mode is active during a traction operation or a thrust operation ($M_{M\_Soll}>0$, $M_{M\_Soll}<0$) and calculating a gradient of the distance from the leading vehicle from the determined distance from the leading vehicle, and carrying out one of a traction upshift or a thrust upshift, if a distance from the leading vehicle is increasing (one's own vehicle is falling back).

5. A method of controlling shifts in an automated gearshift transmission which is arranged in a drivetrain of a motor vehicle in a force flow between a drive engine and one of a drive axle or a transfer box, shift operations of the transmission being controlled as a function of operating parameters and control actions of an adaptive cruise control system (ACC system) that is operable in a speed regulation mode and a distance regulation mode, for controlling the drive engine and at least one brake mechanism of the motor vehicle, to control the gearshift transmission, and when at least one specific operating condition exists, a torque demand ($M_{M\_mod}$), for controlling the gearshift transmission, that differs from a torque demand ($M_{M\_Soll}$) of the adaptive cruise control system (ACC system) on the drive engine is used, the method comprising the steps of:
   determining an operating mode of the adaptive cruise control system (ACC system) that is active at the time and a load direction of the torque demand ($M_{M\_Soll}>0$; $M_{M\_Soll}<0$) of the adaptive cruise control system;
   determining the torque demand ($M_{M\_mod}$) for controlling the gearshift transmission when one of the speed regulation mode or the distance regulation mode is active as a function of the operating mode of the adaptive cruise control system (ACC system) that is active at the time and the load direction of the torque demand of the adaptive cruise control system (ACC); and
   determining, as a fictitious desired thrust ($M_{M\_mod}<0$), the torque demand ($M_{M\_mod}$) for controlling the gearshift transmission when one of the speed regulation mode or the distance regulation mode is active during a thrust operation ($M_{M\_Soll}<0$), the fictitious desired thrust ($M_{M\_mod}<0$) is a function of the torque demand ($M_{M\_Soll}$) on the drive engine and the at least one brake mechanism actuated ($M_{Br\_Mot}$<0, $M_{Br\_Ret}$<0, $M_{Br\_Rad}$<0) such that the torque demand ($M_{M\_mod}$) used for controlling the gearshift transmission is a function of the torque demand ($M_{M\_Soll}$) on the drive engine, a braking torque of the drive engine ($M_{Br\_Mot}$), a braking torque of the permanent brakes ($M_{br\_Ret}$), and a braking torque of the service brakes ($M_{br\_Rad}$)($M_{M\_mod}$=$F_2$($M_{M\_Soll}$, $M_{Br\_Mot}$, $M_{Br\_Ret}$, $M_{br\_Rad}$).

6. The method according to claim 5, further comprising the step of additionally determining climbing resistance when one of the speed or the distance regulation mode is activated during the thrust operation ($M_{M\_Soll}$<0), and calculating a gradient of the climbing resistance, from the climbing resistance, and, if the gradient of the climbing resistance is decreasing, carrying out a thrust upshift.

7. A method of controlling shifts in an automated gearshift transmission which is arranged in a drivetrain of a motor vehicle in a force flow between a drive engine and one of a drive axle or a transfer box, shift operations of the transmission being controlled as a function of operating parameters and control actions of an adaptive cruise control system (ACC system) that is operable in a speed regulation mode and a distance regulation mode, for controlling the drive engine and at least one brake mechanism of the motor vehicle, to control the gearshift transmission, and when at least one specific operating condition exists, a torque demand ($M_{M\_mod}$), for controlling the gearshift transmission, that differs from a torque demand ($M_{M\_Soll}$), of the adaptive cruise control system (ACC system) on the drive engine is used, the method comprising the steps of:

determining an operating mode of the adaptive cruise control system (ACC system) that is active at the time and a load direction of the torque demand ($M_{M\_Soll}$>0; $M_{M\_Soll}$<0) of the adaptive cruise control system;

determining the torque demand ($M_{M\_mod}$) for controlling the gearshift transmission when one of the speed regulation mode or the distance regulation mode is active as a function of the operating mode of the adaptive cruise control system (ACC system) that is active at the time and the load direction of the torque demand of the adaptive cruise control system (ACC); and monitoring with sensors, at least qualitatively, an automatic actuation of service brakes by the adaptive cruise control system (ACC system), when the distance regulation mode is activated during a thrust operation ($M_{M\_Soll}$<0), and, if automatic actuation of the service brakes is detected, a determination of driving resistance is suspended for a duration of the actuation of the service brakes.

8. A method of controlling shifts in an automated gearshift transmission which is arranged in a drivetrain of a motor vehicle in a force flow between a drive engine and one of a drive axle or a transfer box, shift operations of the transmission being controlled as a function of operating parameters and control actions of an adaptive cruise control system (ACC system) that is operable in a speed regulation mode and a distance regulation mode, for controlling the drive engine and at least one brake mechanism of the motor vehicle, to control the gearshift transmission, and when at least one specific operating condition exists, a torque demand ($M_{M\_mod}$), for controlling the gearshift transmission, that differs from a torque demand ($M_{M\_Soll}$) of the adaptive cruise control system (ACC system) on the drive engine is used, the method comprising the steps of:

determining an operating mode of the adaptive cruise control system (ACC system) that is active at the time and a load direction of the torque demand ($M_{M\_Soll}$0; $M_{M\_Soll}$<0) of the adaptive cruise control system;

determining the torque demand ($M_{M\_mod}$) for controlling the gearshift transmission when one of the speed regulation mode or the distance regulation mode is active as a function of the operating mode of the adaptive cruise control system (ACC system) that is active at the time and the load direction of the torque demand of the adaptive cruise control system (ACC); and monitoring one of a solo operation or a trailer operation and automatic actuation of service brakes by the adaptive cruise control system (ACC system) with a respective brake pressure sensor on each braked wheel when the distance regulation mode is active during a thrust operation ($M_{M\_Soll}$<0), and calculating braking torque of the brakes ($M_{Br\_Rad}$), from brake pressures ($p_{Br\_Rad}$>0), and calculating a driving resistance, if the solo operation is detected, while in contrast, suspending the calculation of the driving resistance for a duration of the brake actuation, if the trailer operation is detected.

* * * * *